(12) United States Patent
Brandenburger

(10) Patent No.: US 7,163,208 B2
(45) Date of Patent: Jan. 16, 2007

(54) HYDROPNEUMATIC SUSPENSION SYSTEM FOR VEHICLES

(75) Inventor: Walter Brandenburger, Neuss (DE)

(73) Assignee: Carl Freudenberg KG, Weinheim (DE)

( * ) Notice: Subject to any disclaimer, the term of this patent is extended or adjusted under 35 U.S.C. 154(b) by 353 days.

(21) Appl. No.: 10/776,912

(22) Filed: Feb. 11, 2004

(65) Prior Publication Data
US 2004/0160032 A1 Aug. 19, 2004

(30) Foreign Application Priority Data
Feb. 17, 2003 (DE) .............................. 103 06 756

(51) Int. Cl.
*B60G 17/00* (2006.01)
(52) U.S. Cl. .............................. 280/6.159; 280/124.159
(58) Field of Classification Search ............. 280/6.159, 280/6.157, 6.151, 6.153, 124.157, 124.158, 280/124.159, 124.16, 124.161
See application file for complete search history.

(56) References Cited

U.S. PATENT DOCUMENTS

| | | | |
|---|---|---|---|
| 3,550,993 A * | 12/1970 | Peiffer .................... 280/6.159 |
| 4,967,554 A * | 11/1990 | Kauss ......................... 60/452 |
| 5,046,310 A * | 9/1991 | Kauss ......................... 60/468 |
| 5,318,354 A * | 6/1994 | Tyler ............................. 303/3 |
| 5,338,010 A * | 8/1994 | Haupt ..................... 267/64.16 |
| 6,050,239 A * | 4/2000 | Frankle et al. .............. 123/320 |
| 6,145,859 A * | 11/2000 | Altherr et al. ........ 280/124.159 |
| 6,308,973 B1 * | 10/2001 | Griebel et al. ........ 280/124.159 |
| 6,394,238 B1 * | 5/2002 | Rogala .................... 188/266.2 |
| 6,575,484 B1 * | 6/2003 | Rogala et al. ........ 280/124.158 |
| 6,644,169 B1 * | 11/2003 | Deininger et al. ............. 91/445 |
| 6,669,216 B1 * | 12/2003 | Elser et al. ........... 280/124.106 |
| 6,786,492 B1 * | 9/2004 | Brandenburger ......... 280/5.519 |
| 2005/0225048 A1 * | 10/2005 | Kasamatsu ............. 280/124.16 |

FOREIGN PATENT DOCUMENTS

| | | |
|---|---|---|
| DE | 1780394 | 1/1972 |
| DE | 4242448 | 3/1994 |
| GB | 1326390 | 8/1973 |

* cited by examiner

*Primary Examiner*—David R. Dunn
*Assistant Examiner*—Drew J. Brown
(74) *Attorney, Agent, or Firm*—Davidson, Davidson & Kappel, LLC

(57) ABSTRACT

A hydropneumatic suspension system for a vehicle with a level control, in particular for the front axle of a tractor, includes a first 2/2 directional control valve having a regulating-up function communicating with the pressurized oil pump and a second 2/2 directional control valve having a regulating-down function communicating with a reservoir.

11 Claims, 1 Drawing Sheet

HYDROPNEUMATIC SUSPENSION SYSTEM FOR VEHICLES

Priority is claimed to German Patent Application No. DE 103 06 756.6-21, filed on Feb. 17, 2003, the entire disclosure of which is incorporated by reference herein.

BACKGROUND

The present invention is directed to a hydropneumatic suspension system for a vehicle, in particular for the front axle of a tractor provided with a level control.

Due to the high load distribution they are subjected to, tractors often require a level control system. Depending on the load acting on the axle in question, the vehicle undergoes a spring compression or rebounding, and thus a lowering or lifting of the vehicle body. These variations are sensed by a level-control system, and the vehicle body is returned to its level position by regulating the pressure levels in the hydraulic suspension cylinders of the vehicle up or down, accordingly.

A very simple approach for a level-control system is described in German Patent Application DE 1 780 394 A1. However, the mode of operation of the level-control system it discusses no longer meets the requirements of today's level-control systems.

A hydropneumatic suspension system described in German Patent DE 42 42 448 C1, the entire disclosure of which is incorporated herein, represents a possible improvement. This system is specially conceived for vehicles having high load ratios, in particular for tractors having attachment means for add-on units. A load-sensing pump is used to create a suspension system that has a number of special advantages. This suspension system is able to be used quite advantageously in larger vehicles. However, when used in smaller tractors, i.e., lightweight tractors, it is typically underloaded.

SUMMARY OF THE INVENTION

An object of the present invention is to provide a control block for smaller tractors, whose design is kept simple, making it inexpensive and uncomplicated, without adversely affecting its functional performance characteristics.

The present invention provides a hydropneumatic suspension system for a vehicle, in particular for the front axle of a tractor, in that the level control is carried out via two 2/2 directional control valves, the 2/2 directional control valve having the regulating-up function communicating with the pressurized oil pump and the 2/2 directional control valve having the regulating-down function communicating with a reservoir. Thus, valves of the simple construction are used to attain the necessary opening and blocking, respectively, of the pressure line or also of the discharge line.

The 2/2 directional control valves are designed as directional seat valves. Therefore, valves of a very simple design are used.

To maintain a predefined pressure level in the annular spaces of the hydraulic suspension cylinders, the pressure line of the annular-space suspension circuit is provided with a pressure-controlled 2/2 directional flow-control spool valve. In addition, a non-return valve and a throttle are positioned in the pressure line of the annular-space suspension circuit, downstream from the 2/2 directional flow-control spool valve. The non-return valve prevents the pressurized oil from returning in a manner that is not intended, while the throttle reduces the inflow, to avoid a rapid pressure change.

The relief line of the annular-space suspension circuit may be equipped with a pressure-limiting valve. This valve maintains the elevated pressure in the annular spaces of the suspension cylinders.

To achieve a best possible action of the system, the opening pressure of the pressure-limiting valve and the blocking pressure of the flow-control spool valve are adjusted to one another in such a way that a predefined annular-space pressure level is achieved in the level position of the vehicle. In this context, when the suspension-cylinder stops are reached, the opening pressure of the pressure-limiting valve corresponds to the upper pressure-limiting value of the suspension system, and the blocking pressure of the flow-control spool valve corresponds to the lower pressure-limiting value of the suspension system. Good results are also attained when the pressure-limiting values are slightly below or above these values. In this way, one is able to prevent pressurized oil from flowing in and out, so that the spring action of the suspension within the stops takes place without any change in volume.

Furthermore, it is beneficial for a bypass line, which by-passes the pressure-limiting valve and which is provided with a blocking valve, to be provided in the pressure-relief line of the annular-space suspension circuit. This enables the two suspension circuits to be relieved of pressure via a single relief valve.

BRIEF DESCRIPTION OF THE DRAWING

The present invention is described in detail below, with reference to a drawing, in which.

DETAILED DESCRIPTION

Figure 1:
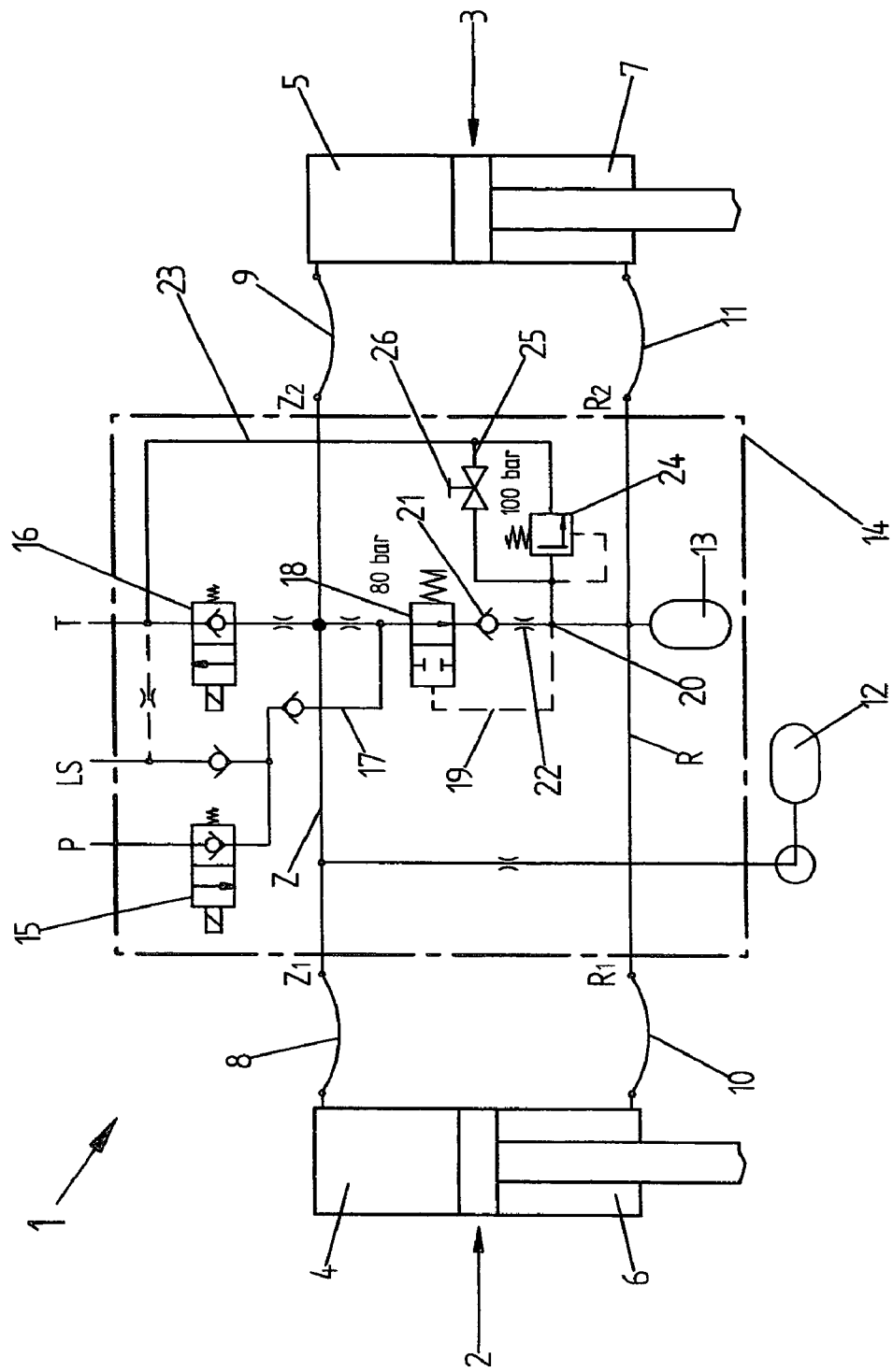
FIG. 1 shows a circuit diagram of a hydropneumatic suspension system according to the present invention.

The hydropneumatic suspension system 1, shown in FIG. 1, has a simple design. Suspension cylinders 2 and 3 of suspension system 1 have cylinder chambers 4 and 5, as well as annular spaces 6 and 7, which communicate via supply lines 8, 9 and 10, 11, respectively, with the cylinder suspension circuit and the annular-space suspension circuit. Each suspension circuit Z or R is connected to a pressure accumulator 12 or 13. Dot-dash line 14 frames the control and/or regulating devices for suspension circuits Z and R. The individual parts of the level-control circuit are of a conventional design.

The vehicle-level control of suspension system 1 is carried out via 2/2 directional control valves 15 and 16. In the process, 2/2 directional control valve 15, which is actuated during the regulating-up function, is connected to pressure pump P, while 2/2 directional control valve 16, which assumes the regulating-down function, is connected to reservoir T. 2/2 directional control valves 15, 16 are designed as directional seat valves. A 2/2 directional flow-control spool valve 18 is positioned in pressure line 17 leading to annular-space suspension circuit R. For the control pressure, flow-control spool valve 18 is connected via control line 19 to annular-space suspension circuit R. Non-return valve 21 and throttle 22 are interposed between 2/2 directional flow-control spool valve 18 and connection point 20 for control line 19.

Pressure-limiting valve 24 is positioned in relief line 23 of annular-space suspension circuit R. This pressure-limiting valve 24 is circumvented by bypass line 25 which is equipped with blocking valve 26.

Opening pressure P1 of pressure-limiting valve 24 and blocking pressure P2 of flow-control spool valve 18 are adjusted to one another in such a way, that, in response to the two cylinder stops being reached, a predefined annular-space pressure level P3 results in the level position of the vehicle.

In this context, it is possible that opening pressure P1 of pressure-limiting valve 24 corresponds to the upper pressure-limiting value and blocking pressure P2 of flow-control spool valve 18 to the lower pressure-limiting value in suspension-cylinder annular space.

The level of the suspension system is adjusted upward in the following manner:

If the suspension system undergoes spring compression in response to an increase in the axle load, then the pressure level in suspension circuit Z increases, and the pressure prevailing in suspension circuit R simultaneously decreases. If, in the area of the spring stop, the pressure of annular-space suspension circuit R, falls below the blocking-pressure value of pressure-controlled flow-control spool valve 18, then the connection to cylinder suspension circuit Z is opened, and, in response to a higher pressure level in Z, pressurized oil flows via non-return valve 21 and via throttle 22 into suspension circuit R, until blocking pressure P2 is reached and the connection is closed again. The feeding of pressurized oil into suspension circuit R is followed by a spring compression of suspension cylinders 2, 3, maximally up to the spring stops. The change in position causes power to be supplied via an electrical level control (not shown) to 2/2 directional control valve 15, so the pressure connection from connection P to control block 14 is opened. The pump pressure is conveyed to the LS control line, so that the pressure at connection P rises until pressurized oil is able to flow via the non-return valve into the supply line leading to suspension circuit Z. In response to an open position of flow-control spool valve 18, pressurized oil is branched off into suspension circuit R to the point of blocking. Pressurized oil is delivered into suspension circuit Z until the axle reaches the level position, and directional control valve 15 is de-energized. In the level position, the annular-space pressure adjusts itself to the required pressure level though piston displacement.

Adjusting the level downward:

In response to unloading of the axle, suspension cylinders 2, 3 rebound. If when the rebound stops are reached, the pressure level in annular-space suspension circuit R exceeds the opening pressure of pressure-limiting valve 24, then excess pressurized oil flows off to connection T. The electrical control energizes 2/2 directional control valve 16 and allows pressurized oil to flow off from suspension cylinder circuit Z to connection T, until the level position is reached, and directional-control valve 16 is de-energized. In the level position, in response to the volume displacement from the annular-space accumulator, the annular space assumes the required counterpressure.

Pressure relief during service work:

To relieve pressure from the suspension system in order to do repair work, only one service valve 26 is to be opened. The pressure is relieved in two stages.

Once service valve 26 is opened, in the first stage, the pressurized oil escapes from annular-space suspension circuit R until the pressure level of the lower limiting value is reached. In the second stage, in response to the pressure value falling below the lower limiting value, flow-control spool valve 18 releases the hydraulic connection to cylinder suspension circuit Z, enabling the pressurized oil to also be completely relieved via suspension circuit R.

In response to the release of pressure in the first stage, vehicle body at first moves slowly upward. Not until the second stage does the vehicle body move slowly down to the spring stops.

It is, therefore, significant that, in the hydraulic interconnection of the cylinders' annular-space suspension circuit, a hydraulically controlled 2/2 directional control valve 18 is installed, and, in the annular-space suspension circuit, a pressure-limiting valve 24 is installed, the hydraulic functional data of the valves being mutually coordinated in such a way that, in the level position, a predefined pressure level is able to be maintained in cylinder annular space R.

What is claimed is:

1. A hydropneumatic suspension system for a vehicle having a level control, the system comprising:
    a pressurized oil pump;
    a reservoir;
    a first 2/2 directional control valve in fluid communication with the pressurized oil pump and configured to adjust a level position of the suspension system upward; and
    a second 2/2 directional control valve in fluid communication with the reservoir and configured to adjust the level position downward.

2. The hydropneumatic suspension system as recited in claim 1, wherein the first and second 2/2 directional control valves are directional seat valves.

3. The hydropneumatic suspension system as recited in claim 1, further comprising an annular-space suspension circuit, a pressure line connecting the first 2/2 directional control valve to the annular-space suspension circuit, and a pressure-controlled 2/2 directional flow-control spool valve disposed in the pressure line.

4. The hydropneumatic suspension system as recited in claim 3, further comprising a non-return valve and a throttle disposed in the pressure line downstream from the 2/2 directional flow-control spool valve.

5. The hydropneumatic suspension system as recited in claim 3, further comprising a relief line in the annular-space suspension circuit and a pressure-limiting valve disposed in relief line.

6. The hydropneumatic suspension system as recited in claim 5, wherein the relief line of the annular-space suspension circuit includes a bypass line by-passing the pressure-limiting valve, the relief line including a blocking valve.

7. The hydropneumatic suspension system as recited in claim 6, wherein the pressure-limiting valve has an opening pressure and the flow-control spool valve has a blocking pressure, the opening pressure and the blocking pressure relating to one another in such a way that a predefined annular-space pressure level defines the level position.

8. The hydropneumatic suspension system as recited in claim 7, wherein the opening pressure corresponds to an upper pressure-limiting value of the suspension system, and the blocking pressure corresponds to a lower pressure-limiting value of the suspension system.

9. The hydropneumatic suspension system as recited in claim 1, wherein the vehicle is a tractor and wherein the level position corresponds to a front axle of the tractor.

10. The hydropneumatic suspension system as recited in claim 1, further comprising a control line for a pressure of the oil pump, the control line being in fluid connection with a side of the first 2/2 directional control valve away from the oil pump, the control line including a non-return valve.

11. The hydropneumatic suspension system as recited in claim 1, further comprising a control line for a pressure of the oil pump, the control line being connected to the reservoir independently of the first 2/2 directional control valve.

* * * * *